United States Patent
Sathik et al.

(10) Patent No.: US 11,251,719 B1
(45) Date of Patent: Feb. 15, 2022

(54) SWITCHED-CAPACITOR MULTILEVEL INVERTER WITH SELF-VOLTAGE-BALANCING FOR HIGH-FREQUENCY POWER DISTRIBUTION SYSTEM

(71) Applicant: KING ABDULAZIZ UNIVERSITY, Jeddah (SA)

(72) Inventors: M. Jagabar Sathik, Jeddah (SA); Kaustubh Bhatnagar, Jeddah (SA); Yam P. Siwakoti, Jeddah (SA); Hussain M. Bassi, Jeddah (SA); Muhyaddin Rawa, Jeddah (SA); N. Sandeep, Jeddah (SA)

(73) Assignee: KING ABDULAZIZ UNIVERSITY, Jeddah (SA)

(*) Notice: Subject to any disclaimer, the term of this patent is extended or adjusted under 35 U.S.C. 154(b) by 0 days.

(21) Appl. No.: 17/132,119

(22) Filed: Dec. 23, 2020

(51) Int. Cl.
*H02M 7/53* (2006.01)
*H02M 7/537* (2006.01)
*H02M 7/483* (2007.01)

(52) U.S. Cl.
CPC .......... *H02M 7/537* (2013.01); *H02M 7/483* (2013.01)

(58) Field of Classification Search
CPC ........ H02M 7/537; H02M 7/483; H02M 3/07; H02M 3/073
See application file for complete search history.

(56) References Cited

U.S. PATENT DOCUMENTS

| | | | | |
|---|---|---|---|---|
| 5,481,447 A | * | 1/1996 | Caris | H02M 3/07 363/60 |
| 8,957,645 B2 | * | 2/2015 | Glovinski | H02M 1/34 323/259 |
| 10,396,681 B1 | * | 8/2019 | Bassi | H02M 7/53871 |
| 10,715,037 B2 | * | 7/2020 | Xiong | H02M 3/07 |
| 2013/0301314 A1 | * | 11/2013 | Fu | H02J 3/38 363/37 |
| 2015/0263644 A1 | * | 9/2015 | Fu | H02M 7/48 363/95 |
| 2017/0194877 A1 | * | 7/2017 | Kadam | H02M 7/487 |
| 2018/0131290 A1 | * | 5/2018 | Ng | H02M 7/483 |
| 2019/0131886 A1 | * | 5/2019 | Bassi | H02M 7/483 |

FOREIGN PATENT DOCUMENTS

CN 111293912 A * 6/2020
CN 110138250 B * 10/2020

OTHER PUBLICATIONS

A Switched Capacitor Multilevel Inverter with Voltage Boosting Ability, Nitin Kumar; Sushma J Patil; M.S. Aspalli, Date of Conference: Oct. 30-31, 2020, Date Added to IEEEXplore: Dec. 17, 2020 https://ieeexplore.ieee.org/document/9278107.*

* cited by examiner

*Primary Examiner* — Rafael O De Leon Domenech
(74) *Attorney, Agent, or Firm* — W&C IP

(57) ABSTRACT

Switched capacitor multilevel inverter (SCMLI) configuration for high-frequency medium voltage applications is presented. A 5L-SCMLI basic configuration is further extended to 9L operation with a reduced number of active switches having self voltage boosting and balancing ability. Further, the proposed 9L-SCMLI is extended up to n level being considered as the basic configuration for the extension of horizontal extension (HE) and vertical extension (VE). A generalized switching table is provided for the proposed extensions. Design of the size of capacitor demonstrated for the proposed 9L-SCMLI.

5 Claims, 21 Drawing Sheets

SWITCHED-CAPACITOR MULTILEVEL INVERTER WITH SELF-VOLTAGE-BALANCING FOR HIGH-FREQUENCY POWER DISTRIBUTION SYSTEM

BACKGROUND OF THE INVENTION

Field of the Invention

The present invention generally relates to a switched capacitor multilevel inverter (SCMLI) and, more particularly, to a new family of hybrid SCMLI for high frequency power distribution system.

Background Description

NASA has introduced the high-frequency AC (HFAC) power distribution system (PDS) for space applications, as it offers several merits over the conventional DC power distribution. HFAC PDS is also an attractive solution to other applications like telecom, electric vehicles and renewable energy micro grids. The high frequency inverters have advantages like reduced high order hat monies and low current ripple harmonics in induction motor drives. Power converters play a major role in microgrids due to their advantages like being efficient, reliable, managed heat distribution and high power density. Multilevel inverters (MLIs) are one of the emerging converters owing to their several structural benefits in terms of easy extension, reduced voltage stress (dv/dt) and having equal load sharing and efficient energy harvesting making them highly suitable for various renewable energy applications. Among several MLIs, switched capacitor MLIs (SCMLI) are the most widely used because of the features of voltage boosting over conventional ones with reduced number of dc sources. To generate a higher number of voltage levels, cascaded MLIs are taken into consideration aiming for reduced number of devices but it ends up having high blocking voltage and does not ensure the voltage boosting feature.

Hybrid MLIs having reduced semiconductor devices ensures their ability to have an increased number of levels either by cascading multiple units into each other or by providing a backend H-Bridge, but they suffer from the problems of high blocking voltage with an increased number of semiconductor elements. Cascading subunits of the SCMLI to obtain a desired output voltage with an increased number of capacitors attaining parallel connection attains high boosting ratio but suffers high blocking voltage, results in increased switching losses, conduction losses. However, the increased number of de sources with asymmetric configuration is capable to generate a desired output voltage level, but at the price of no boosting ability. A quasi Z-multilevel inverter with multiple switched capacitors are connected in series/parallel to generate high number of voltage level. Even though, the topology uses single dc source, the choosing of resonance circuit (both capacitance and inductance) value is difficult. A boost type inverter with increased number of switches and capacitors to generate a desired output voltage, which results in high cost of implementation as compared to others, is presented in. Several SC cells are being cascaded containing the same number of units in each cell having higher gain ratio with increased power losses, which results in lower efficiency and high heat dissipation because of high blocking voltage. A topology to generate a step up in voltage by providing isolation on both input and output side switching losses and high dv/dt has been presented. Increasing number of power switches with an aim of generating desired output voltage. Cross-switched MLI having high blocking voltage with reduced number of components with multiple structural configuration has been proposed. Employing a single dc source, topology in is very elegant for high frequency AC power source, however, at the price of increased number of semiconductor devices. An interesting way of cascading H-Bridge to acquire higher number of levels requires high cost of implementation with increased number of sources and capacitor count. Multiple dc sources connected in parallel to each other with series conversion for voltage step up results in high blocking voltage and low efficiency. Despite several attempts to reduce the complexity of the SCMLIs for HFAC PDS, the component count stands still high.

SUMMARY OF THE INVENTION

It is therefore an object of the present invention to provide a new family of hybrid SCMLI employing a single voltage source with reduced components resulting in less implementation complexity and lower cost.

According to the invention, there is provided a novel five-level (5L) SCMLI for generating higher number of voltage levels with reduced number of components. The 5L SCMLI circuit generates a peak output voltage of magnitude twice the input voltage in five distinct voltage levels. This basic 5L SCMLI circuit is extended to the generation of a nine-level (9L) voltage SCMLI circuit. This extension of the 9L-SCMLI is made on the basis of structural modification of the basic 5L SCMLI circuit and generates a peak output voltage of magnitude twice the input voltage in nine distinct voltage levels. The 9L SCMLI circuit can be further extended horizontally (HE) or vertically (VE) by replicating a cell within the basic circuit to generate a higher number of higher voltage levels in multiple distinct voltage levels, the number of voltage levels being a function of the number of cells.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION THE INVENTION

Figure 1:
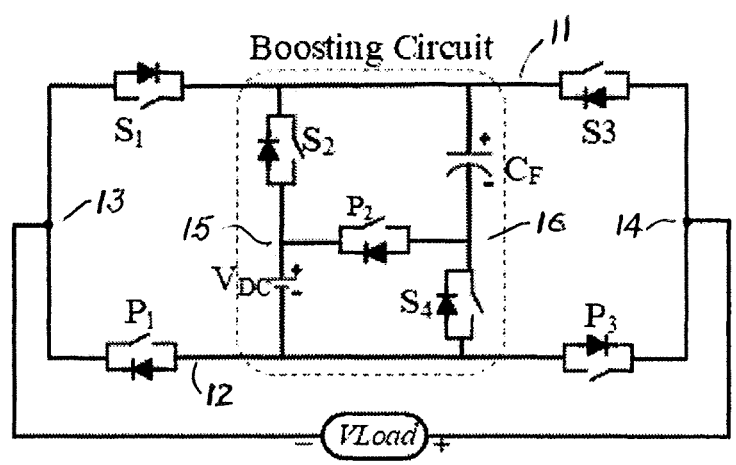
FIG. 1 is a schematic diagram of the hybrid 5L SCMLI circuit according the basic implementation of the invention.

Referring now to the drawings, and more particularly to FIG. 1, there is shown the basic unit of the hybrid 5L SCMLI circuit according to the invention. It consists of a single DC power supply $V_{dc}$, a capacitor $C_F$, and seven switches $S_1$ to $S_4$ and $P_1$ to $P_3$ to generate a peak output voltage of magnitudetwice the input voltage. The circuit arrangement is topologically that of a bridge circuit within a bridge circuit. The outer bridge circuit comprises switches $S_1$ and $P_1$ in one series arm and switches $S_3$ and $P_3$ in a second series parallel arm, with switches $S_1$ and $S_3$ connected to a first junction 11 of the bridge, switches $P_1$ and $P_3$ connected to a second junction 12 of the bridge, switches $S_1$ and $P_1$ connected to a third junction 13 of the bridge, and switches $S_3$ and $P_3$ connected to a fourth junction 14 of the bridge. The inner bridge circuit, hereinafter referred to as the boosting circuit, comprises switch $S_2$ and power supply $V_{dc}$ in one series arm and capacitor $C_F$ and switch $S_4$ in a second series parallel arm, with switch $S_2$ and capacitor $C_F$ each connected to the first junction 11 and power supply $V_{dc}$, and switch $S_4$ each connected to the second junction 12. Switch $P_2$ is connected between a fifth junction 15 of switch $S_2$ and power supply $V_{dc}$ and a sixth junction 16 of capacitor $C_F$ and switch $S_4$. Finally, a load is connected across the third and fourth junctions 13 an 14 to complete the circuit.

For the 5L SCMLI circuit of FIG. 1, the switching scheme listed in Table 1 includes the state of the diode and capacitor to have a better and quick understanding of the current path for each cycle. At level +1 Vdc, capacitor CF gets charged. Similarly, at level 0 the capacitor CF also gets charged. At level ±2 Vdc capacitor CF is discharging and its voltage remains unchanged for level −1 Vdc. Therefore the 5L SCMLI inverter is equipped with self-voltage balancing and voltage boosting ability with reduced semiconductor elements, decreasing the cost of implementing and as such does not required additional circuitry for balancing capacitor voltage, which reduces the complexity in the converter design.

TABLE 1

Switching Scheme of 5L SCMLI

| Voltage levels | Switches | | | | | | | Capacitor |
|---|---|---|---|---|---|---|---|---|
| | $S_1$ | $S_2$ | $S_3$ | $S_4$ | $P_1$ | $P_2$ | $P_3$ | $C_F$ |
| +1 $V_{dc}$ | 0 | 1 | 1 | 1 | 1 | 0 | 0 | C |
| +2 $V_{dc}$ | 0 | 0 | 1 | 0 | 1 | 1 | 0 | D |
| 0 | 1 | 1 | 1 | 1 | 0 | 0 | 0 | C |
| −1 $V_{dc}$ | 1 | 1 | 0 | 1 | 0 | 0 | 1 | — |
| −2 $V_{dc}$ | 1 | 0 | 0 | 0 | 0 | 1 | 1 | D |

Figure 2:
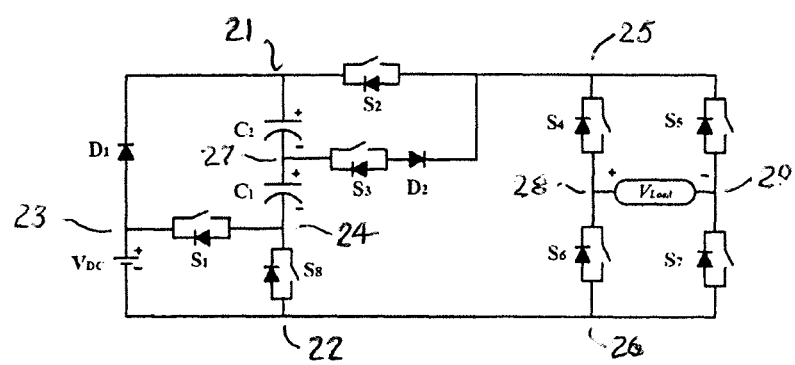
FIG. 2 is a schematic diagram of the 9L SCMLI circuit derived from the 5L SCMLI shown in FIG. 1.
Figure 3A:
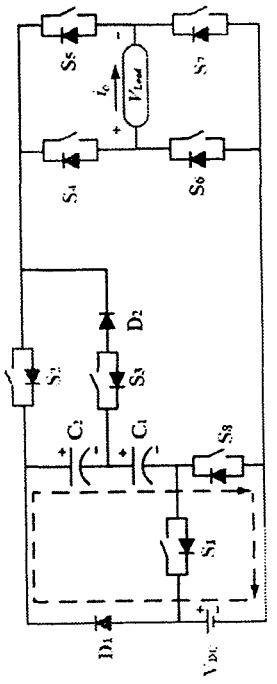
FIGS. 3A to 3D are schematic diagrams of the 9L SCMLI circuit of FIG. 2 showing modes of operation for a positive half cycle.
Figure 3B:
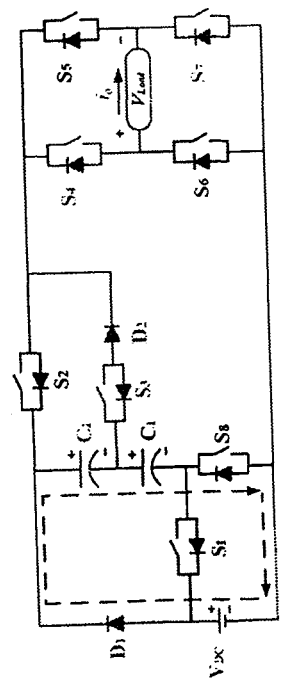
Figure 3C:
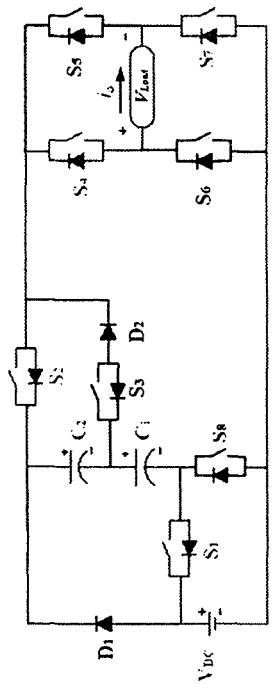
Figure 3D:
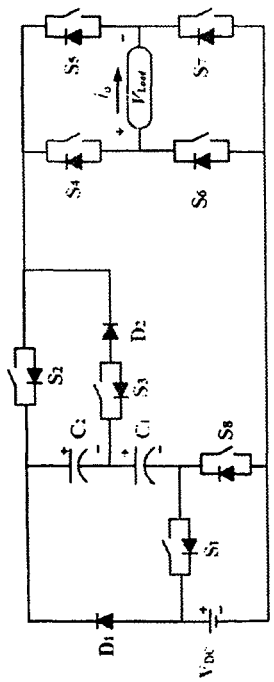

A 9L SCMLI inverter is shown in FIG. 2, and it is derived from the 5L SCMLI inverter of FIG. 1 by adding an H-bridge in the backend to change the polarity and capacitors are attached in series/parallel to each other to achieve the desired output voltage. The 9L SCMLI inverter topology comprises two parallel bridge circuits and comprises eight switches, two diodes and two capacitors for generating a peak output of twie the input voltage which comprises nine distinct output voltage levels: ±2 $V_{dc}$, ±3 $V_{dc}/2$, ±$V_{dc}$, ±$V_{dc}/2$, and 0. The first bridge circuit comprises a first arm of the power supply $V_{dc}$ connected in series with a diode $D_1$ and a second parallel arm of a switch $S_8$ connected in series with two series connected capacitors $C_1$ and $C_2$. Diode $D_1$ and capacitor $C_2$ are connected to a first junction 21, and power supply $V_{dc}$ and switch $S_8$ are connected to a second junction 22. Switch $S_1$ is connected between a third junction 23 of power supply $V_{dc}$ and diode $D_1$ and a fourth junction 24 of switch $S_8$ and capacitor $C_1$. The second bridge circuit comprises a first arm of switches $S_6$ and $S_4$ connected in series and a second parallel arm of switches $S_7$ and $S_5$ connected in series. Switches $S_4$ and $S_5$ are connected to a fifth junction 25, while switches $S_6$ and $S_7$ are connected to a sixth junction 26. The fifth junction 25 is connected to the first junction 21 via switch $S_2$, while the sixth junction 26 is directly connected to the second junction 22. In addition, a seventh junction 27 between capacitors $C_1$ and $C_2$ is connected to the fifth junction 25 via series connected switch $S_3$ and diode $D_2$. Finally, the load is connected between an eighth junction 28 between switches $S_4$ and $S_6$ and a ninth junction 29 between switches $S_5$ and $S_7$.

The different modes of operation for the 9L SCMLI inverter shown in FIG. 2 and, for a better understanding, current path is also shown in FIGS. 3A to 3D for positive half cycle, where $i_0$ represents the direction of current. During +$V_{dc}/2$, FIG. 3A first positive level, and +$V_{dc}$, FIG. 3B second positive level, both capacitors $C_1$ and $C_2$ are charged initially generating an output voltage equivalent to +$V_{dc}/2$ and +$V_{dc}$, respectively. While, during +3 $V_{dc}/2$, FIG. 3C third positive level, capacitor $C_1$ is discharged to generate output voltage equivalent to +3 $V_{dc}/2$. Then, during +2$V_{dc}$, FIG. 3D fourth positive level, both capacitors $C_1$ and $C_2$ are discharged collectively generating output voltage equivalent to +2 $V_{dc}$ and so on, as during +$V_{dc}$ and +2$V_{dc}$ both capacitors are charged and discharged collectively sharing the same charging and discharging current; therefore, maintaining the constant output current. Whereas, the primary function of the backend H-bridge is to operate at fundamental cycle and change the polarity of the output voltage switching $S_4$ and $S_7$ on for positive half, $S_5$ and $S_6$ on for negative half and also to generate zero level as switches $S_4$ and $S_5$ are turned on. Some of the prominent features of the 9L-SCMLI inverter has the following features:

Generates output voltage of magnitude twice the input voltage ($V_{out}=2\,V_{in}$).

Only eight power switches, two diodes, single source and two capacitors are used to generate desired output voltage requiring reduced number of components are required.

Does not require additional circuits for balancing capacitors voltage as it has self-balancing and self-voltage boosting ability with reduced complexity.

The 9L-SCMLI inverter can be further extended based on the structural point of view to generate higher number of levels in all possible directions to generate desired output voltage. The possible ways of extension can be achieved in two ways: horizontal extension (HE) and vertical extension (VE), which are discussed in detail below.

Figure 4:
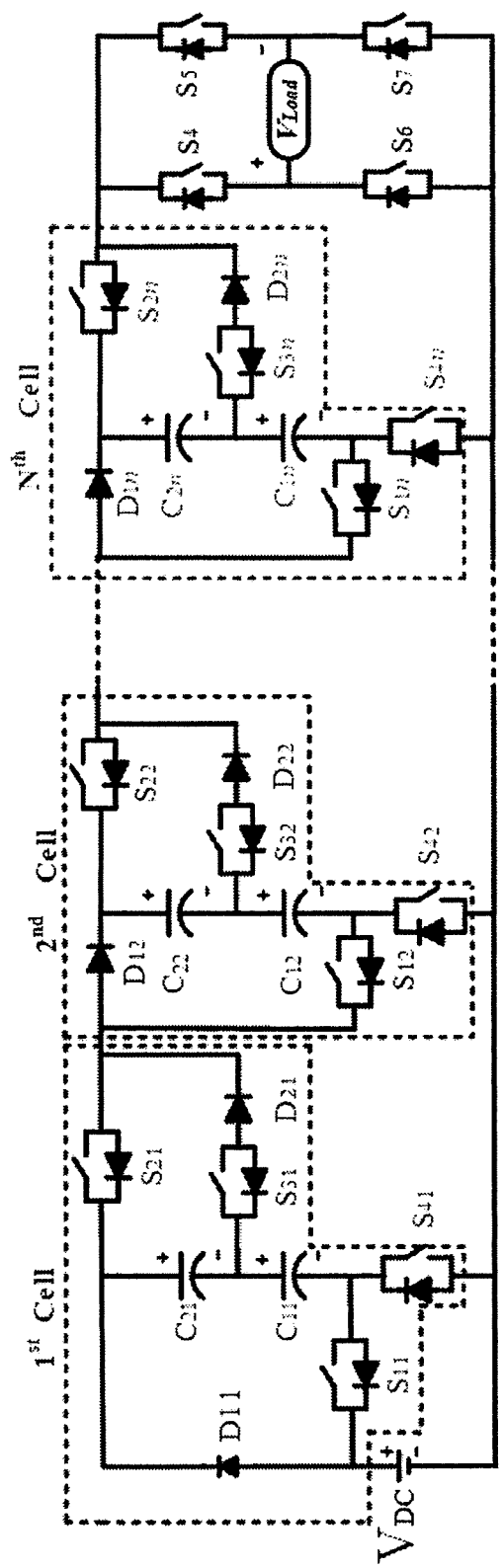
FIG. 4 is a schematic diagram illustrating a horizontal extension (HE) of the 9L SCMLI circuit based on a structural point of view to generate higher number of levels.

FIG. 4 shows the extension of the 9L-SCMLI inverter in the horizontal direction to generate higher number of levels and is here after referred to as 9L-SCMLI (HE). It can be extended up to $N^{th}$ cell as $1^{st}$ cell, $2^{nd}$ cell ... $N^{th}$ cell. Each cell contains a desired number of units having same configuration throughout the circuit up to its extension, which can be extended as switches $S_{11}, S_{12}, S_{13} \ldots, S_{1n}$. Similarly, switches $S_{21}, S_{22}, S_{23}, \ldots, S_{2n}$, switches $S_{31}, S_{32}, S_{33}, \ldots, S_{3n}$ and switches $S_{41}, S_{42}, S_{43}, \ldots, S_{4n}$, diodes $D_{11}$ and $D_{21}$ and capacitors $C_{11}$ and $C_{21}$ are extended in the same manner. As capacitors $C_{11}$ and $C_{21}$ are connected in parallel to each other, it provides a step up in voltage. Further, operation of the 9L-SCMLI (HE) is discussed in brief.

Generalised switching pattern of the proposed 9L-SCMLI (HE) is listed in Table 2, which can be generated with the help of FIG. 4 as it represents the extension of the 9L-SCMLI inverter in the horizontal direction up to n. Further, the charging and discharging of capacitors $C_{11}, C_{12}, C_{13}, \ldots, C_{1n}$ and capacitors $C_{21}, C_{22}, C_{23}, \ldots, C_{2n}$) are similar to Table 2. When opted for higher number of voltage levels, capacitors are charged for a longer period. While, discharging period of capacitors decreases for higher number of voltage levels. In order to validate the following results, generalized equations (1) to (6) are provided.

$$N_L = 4n+1 \tag{1}$$

$$N_{cap} = 2(n-1) \tag{2}$$

$$N_d = 2(n-1) \tag{3}$$

$$N_{sw} = N_{driver} = 4n \tag{4}$$

$$V_{max} = nV_{dc} \tag{5}$$

$$V_{in}:V_{out} = 1:n \tag{6}$$

where $N_{sw}$ represents number of switches, $k_{cap}$ is the number of capacitors, $N_d$ is the number of diodes, $N_L$ is the number of voltage levels and $V_{max}$ is the maximum output voltage, where, n is dependent upon maximum gain to be generated as it satisfies the condition n=2.

TABLE 2

Generalized Switching Pattern for HE

| Output Voltage ($V_o$) | On state of switches | | | | Diodes conducting state | | Capacitor States | |
|---|---|---|---|---|---|---|---|---|
| | $S_{11}, S_{12}, \ldots, S_{1n}$ | $S_{21}, S_{22}, \ldots, S_{2n}$ | $S_{31}, S_{32}, S_{3n}$ $S_{41}, \ldots, S_{4n}$ | $S_4, S_5, S_6, S_7$ | $D_{11}, \ldots, D_{1n}$ | $D_{21}, \ldots, D_{2n}$ | $C_{11}, \ldots, C_{1n}$ | $C_{21}, \ldots, C_{2n}$ |
| $+V_{dc}/2$ | -, ..., - | $S_{21} \ldots S_{2(n-1)}$ | $S_{3n}$, -..  $S_{41} \ldots S_{4n}$ | $S_4, S_7$ | $D_{11} \ldots D_{1n}$ | -...-, $D_{2n}$ | C, C ..., C | C, C ..., C |
| $+V_{dc}$ | -, ..., - | $S_{21} \ldots S_{2n}$ | -...-  $S_{41} \ldots S_{4n}$ | $S_4, S_7$ | $D_{11} \ldots D_{1n}$ | -, ..., - | C, C ..., C | C, C ..., C |
| $+3V_{dc}/2$ | -...-, $S_{1n}$ | $S_{21} \ldots S_{2(n-1)}$ | $S_{3n}$, -..  $S_{41} \ldots S_{4(n-1)}$ | $S_4, S_7$ | $D_{11} \ldots D_{1(n-1)}$ | -...-, $D_{2n}$ | C, ..., C, D | C, ..., C, - |
| $+2V_{dc}$ | -...-, $S_{1n}$ | $S_{21} \ldots S_{2(n-1)}$ | -, ...-  $S_{41} \ldots S_{4(n-1)}$ | $S_4, S_7$ | $D_{11} \ldots D_{1(n-1)}$ | -, ..., - | C, ..., C, D | C ... C, D |
| $+5V_{dc}/2$ | -...-$S_{1(n-1)}$ $S_{1n}$ | $S_{21} \ldots S_{2(n-2)}$ | $S_{3(n-1)}$, $S_{41} \ldots S_{4(n-2)}$ -..- | $S_4, S_7$ | $D_{11} \ldots D_{1(n-2)}$ | -...-, $D_{2(n-1)}$ | C ... C, D, D | C ... C, -, D |
| $+3V_{dc}$ | -...-$S_{1(n-1)}$ $S_{1n}$ | $S_{21} \ldots S_{2(n-2)}$ | -, ...-  $S_{41} \ldots S_{4(n-2)}$ | $S_4, S_7$ | $D_{11} \ldots D_{1(n-2)}$ | -, ..., - | C ... C, D, D | C ... C, D D |
| ... | ... | ... | ... ... | ... | ... | ... | ... | ... |
| $+(n+1)V_{dc}$ | $S_{11} \ldots S_{1n}$ | $S_{21} \ldots S_{2n}$ | -, ..., - -, ..., - | $S_4, S_7$ | -, ..., - | -, ..., - | D, D, ..., D | D, D, ..., D |
| $-(n+1)V_{dc}$ | $S_{11} \ldots S_{1n}$ | $S_{21} \ldots S_{2n}$ | -, ..., - -, ..., - | $S_5, S_6$ | -, ..., - | -, ..., - | D, D, ..., D | D, D, ..., D |
| $0 \cdot V_{dc}$ | -, ..., - | -, ..., - | -, ..., - -, ..., - | $S_4, S_5$ | -, ..., - | -, ..., - | -, ..., - | -, ..., - |

* - = OFF state and ... = Continuation of previous states.

Figure 5:
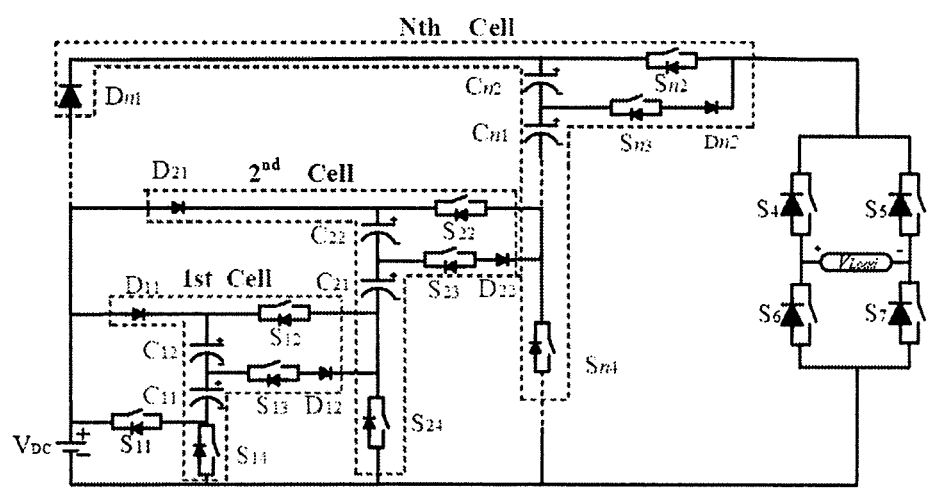
FIG. 5 is a schematic diagram illustrating a vertical extension (VE) of the 9L SCMLI circuit based on a structural point of view to generate higher number of levels.

FIG. 5 shows the extension of the 9L-SCMLI inverter in a vertical configuration and hereafter referred to as 9L-SCMLI (VE). As it can be extended up to $N^{th}$ cell, each cell containing an acquired number of units of two switches $S_{12}, S_{22}, \ldots, S_{n2}$) and switches $S_{14}, S_{24}, \ldots, S_{n4}$), three diodes $D_{11}, D_{21}, \ldots, D_{n1}$) and diodes $D_{12}, D_{22}, \ldots, D_{n2}$) and two capacitors $C_{11}, C_{12}, \ldots, C_{1n}$) and capacitors $C_{12}, C_{22}, \ldots, C_{n2}$) connected in parallel to each other to provide a stepped up output voltage. Equations (7) to (12) correspond to 9L-SCMLI (VE) for extending up to n and can be validated with the help of FIG. 5, where, n is dependent upon maximum gain to be generated as it satisfies the condition n≥2. Generalized switching pattern of the proposed extension can be seen from Table 3 for generating (n+1) $V_d$, voltage levels. Charging and discharging of capacitors with respect to desired voltage level can be seen from Table 3

$$N_L = 4n+1 \tag{7}$$

$$N_{cap} = 2(n-1) \tag{8}$$

$$N_d = 2(n-1) \tag{9}$$

$$N_{sw} = N_{driver} = 3n+2 \tag{10}$$

$$V_{max} = nV_{dc} \tag{11}$$

$$V_{in}:V_{out} = 1:n \tag{12}$$

Figure 6:
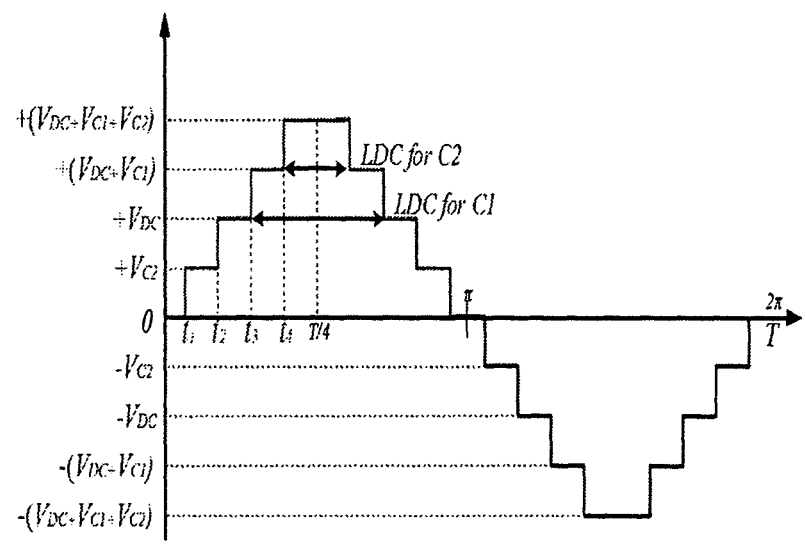
FIG. 6 is a graph illustrating the nine-level output voltage waveform of the 9L SCMLI circuit.

The determination of a suitable capacitance value is another important factor for SCMLI topologies. Here, the determination of capacitance for the proposed 9L-SCMLI is discussed. For determining the value of capacitance, longest discharging cycle (LDC) of each capacitor is taken into account. To aid this, FIG. 6 representing the waveform of the proposed 9L-SCMLI at fundamental frequency is included.

resistive inductive loading condition function IL(t) can be expressed as $$I_L(t) = I_{max} \sin(\omega t - \varphi) \quad (18)$$

By solving (13) to (18) at given conditions, the optimum value of capacitors at pure resistive load and resistive-inductive load are shown in the following equation:

TABLE 3

Generalized Switching Pattern for the VE

| Output Voltage ($V_o$) | On state of switches | | | | Diodes conducting state | | Capacitor States | |
|---|---|---|---|---|---|---|---|---|
| | $S_{11}$ | $S_{n2} \ldots S_{22}$, $S_{12}$ | $S_{n3} \ldots$ $S_{32}S_{13}$ | $S_{n4} \ldots S_{24}$, $S_{14}$ $S_6$, $S_7$ | $S_4$, $S_5$, | $D_{n2}, \ldots D_{22}$, $D_{21}$ | $D_{21}, \ldots, D_{2n}$ | $C_{n1} \ldots C_{21}$, $C_{11}$ | $C_{n2} \ldots C_{22}$, $C_{12}$ |
| $+V_{dc}/2$ | -, ..., - | -, ..., - | $S_{3n}$, -, ..., - | $S_{n4} \ldots S_{24}$, $S_{14}$ $S_4$, $S_7$ | | $D_{11}, D_{21} \ldots D_{n1}$ | $D_{n2}$, -, ..., - | C, C, ..., C | C, C, ..., C |
| $+V_{dc}$ | -, ..., - | -, $S_{n2}$, -, ..., - | -, ..., - | $S_{n4} \ldots S_{24}$, $S_{14}$ $S_4$, $S_7$ | | $D_{11}, D_{21} \ldots D_{n1}$ | -, ..., - | C, C, ..., C | C, C, ..., C |
| $+3 V_{dc}/2$ | -, ..., - | -, $S_{(n-1)2}$, -, ..., - | $S_{3n}$, -, ..., - | $S_{(n-1)4} \ldots S_{14}$ $S_4$, $S_7$ | | $D_{(n-1)1}, \ldots, D_{11}$ | $D_{n2}$, -, ..., - | D, C, ..., C | -, C, C, ... C |
| $+2 V_{dc}$ | -, ..., - | -, $S_{n2}$, $S_{(n-1)2}$ -, ... - | -, ..., - | $S_{(n-1)4}, \ldots S_{14}$ $S_4$, $S_7$ | | $D_{(n-1)1}, \ldots, D_{11}$ | -, ..., - | D, C, ..., C | D, C, ..., C |
| $+5 V_{dc}/2$ | $S_{11}$ | -, ..., - | $S_{(n-1)3}$, -, ... - | $S_{(n-2)4}, \ldots S_{14}$ $S_4$, $S_7$ | | $D_{(n-2)1}, \ldots, D_{11}$ | $D_{(n-1)2}, \ldots, D_{12}$ | D, D, C, ..., C | C D, -, C, ..., C |
| $+3 V_{dc}$ | $S_{11}$ | $S_{n2}$, -, $S_{(n-2)}$, -, - | -, ..., - | $S_{(n-2)4} \ldots S_{14}$ $S_4$, $S_7$ | | $D_{(n-2)1}, \ldots, D_{11}$ | -, ..., - | D, D, C, ..., C | C D, D, C, ..., C |
| ... | ... | ... | ... | ... | | ... | ... | ... | ... |
| $+(n+1) V_{dc}$ | -, $S_{11} \ldots S_{n2}, \ldots, S_{12}$ | | -, ..., - | $S_{(n-1)4} \ldots S_{14}$ $S_4$, $S_7$ | | $D_{(n-1)1}, \ldots, D_{11}$ | -, ..., - | D, D, ..., D | D, D, ..., D |
| $-(n+1) V_{dc}$ | -, $S_{11} \ldots S_{n2}, \ldots, S_{12}$ | | -, ..., - | $S_{(n-1)4} \ldots S_{14}$ $S_5$, $S_6$ | | $D_{(n-1)1}, \ldots, D_{11}$ | -, ..., - | D, D, ..., D | D, D, ..., D |
| $0 \cdot V_{dc}$ | -, ..., - | -, ..., - | -, ..., - | -, ..., - | $S_4$, $S_5$ | -, ..., - | -, ..., - | -, ..., - | -, ..., - |

As evident, LDC for both capacitors $C_1$ and $C_2$ occur in both positive and negative cycles at different time intervals from different voltage levels. Therefore, maximum discharging value for each capacitor can be concluded from the following equations:

$$Q_{C1} = 2 \times \int_{T_3}^{T/4} I_L(t)dt \quad (13)$$

$$Q_{C2} = 2 \times \int_{T_4}^{T/4} I_L(t)dt \quad (14)$$

Here, $Q_{Ci}$ for =1, 2 represents the maximum discharging amount of capacitors. In equation, $k \times V_{dc}$ represents maximum allowable voltage ripple of capacitors, optimum value of capacitors can be obtained from $$C_{opt}i \geq \frac{Q_{Ci}}{k \times V_{dc}} \quad (15)$$

Considering the equation of load current for a pure resistive load ($R_L$) at third and fourth positive output voltages at steady-state conditions, the following can be derived:

$$I_L(t) = \frac{3V_{dc}}{2R_L}, \quad t_3 \leq t \leq \frac{T}{4} \quad (16)$$

$$I_L(t) = \frac{2V_{dc}}{R_L}, \quad t_4 \leq t \leq \frac{T}{4} \quad (17)$$

Further, the fundamental switching timing instants $t_3$ and $t_4$ are equal to 3 T/20 and T/5 and are obtained from cutting of DC levels to sinusoidal function of reference waveform. For $$C_{opt,i} \geq \frac{7\pi}{10 R_L \times k \times \tilde{\omega}} \quad (19)$$

$$C_{opt,i} \geq \frac{2 I_{max}}{k \times V_{dc} \times \tilde{\omega}}\left[\cos\left(\frac{\pi}{10} - \varphi\right) + \sin\left(2\frac{\pi}{5} + \varphi\right)\right] \quad (20)$$

Figure 7A:
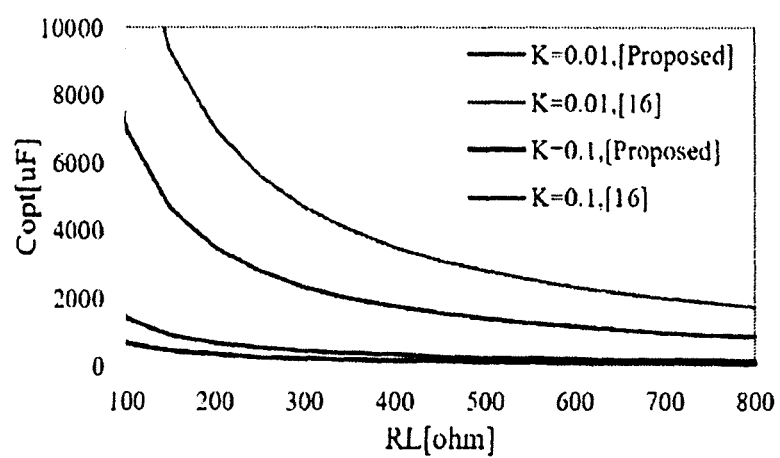
FIGS. 7A to 7C are graphs illustrating variation of optimal capacitance versus resistive load (RL), frequency (f), and phase angle (Φ), respectively.
Figure 7B:
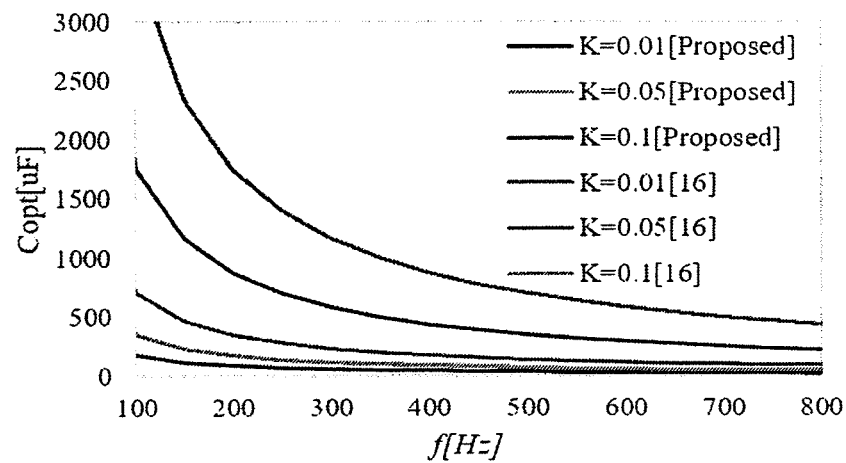

It is worth mentioning that equations (19) and (20) represent the optimum value of capacitors for the 9L-SCMLI, inverter which shows an inverse relation with k, ω and $R_L$ from equation (19). To have a better understanding for determining appropriate value of capacitance, a graph is shown in FIG. 7A between $C_{opt}$ and $R_L$ at different values for an allowable voltage ripple keeping co fixed at the value 100π. From FIG. 7B, it can be concluded that a larger rate of allowable voltage ripple has led to smaller capacitance. By increasing the output frequency at different values of $R_L$, the value of optimum capacitance gets reduced but may lead to increase in switching losses at higher output frequency. In order to provide a better clarification, a graph is being plotted between different variations of $C_{opt}$ at different values of output frequency at fixed resistive load $R_L$=200Ω for higher frequency at allowable voltage ripple.

Figure 7C:
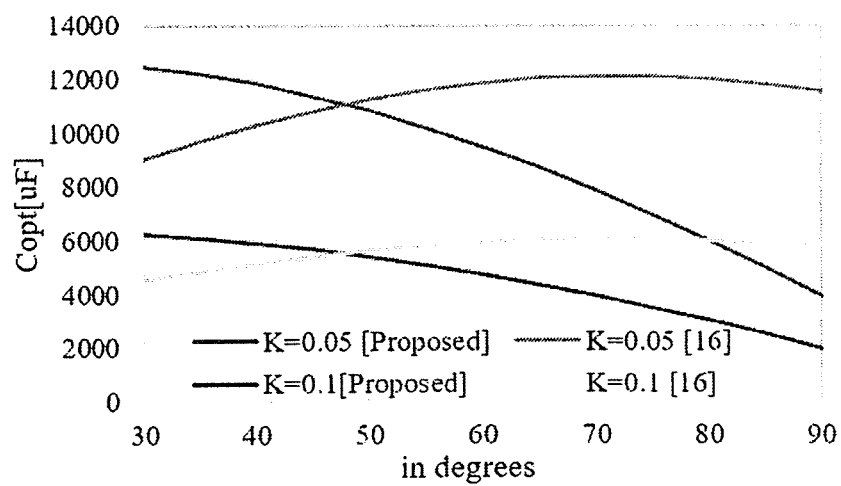
Figure 8A:
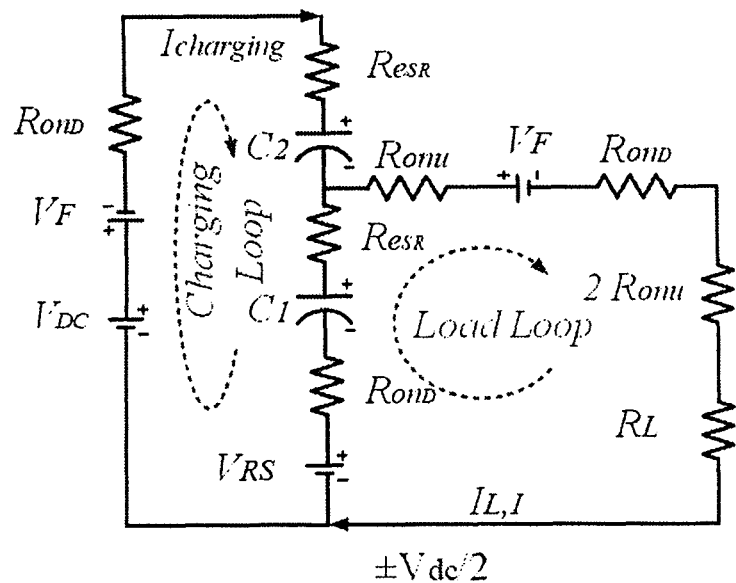
FIGS. 8A to 8D are schematic diagrams of the equivalent circuit of the 9L SCMLI at different modes.
Figure 8B:
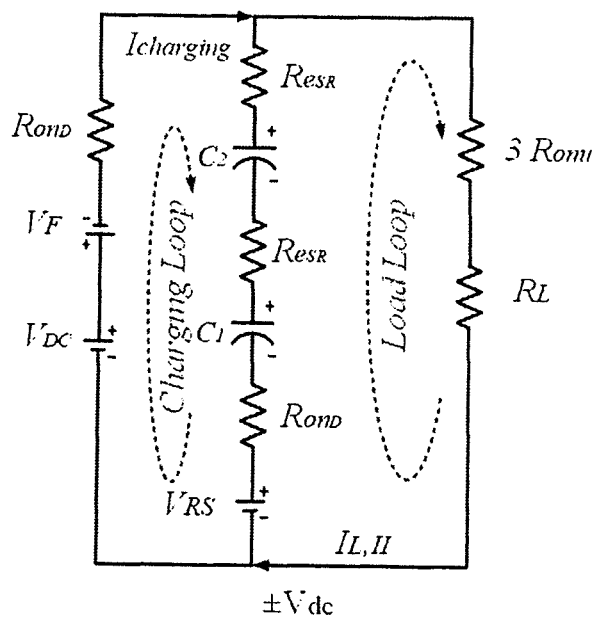
Figure 8C:
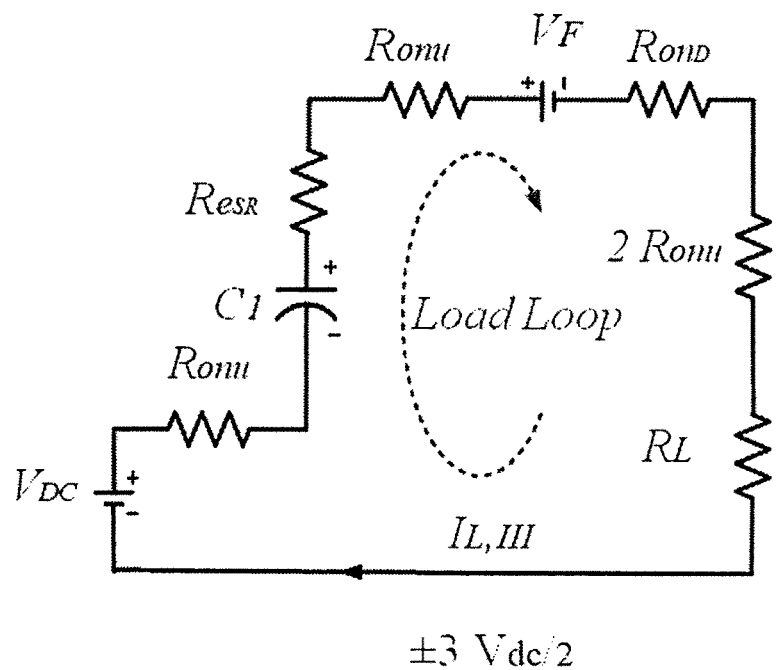
Figure 8D:
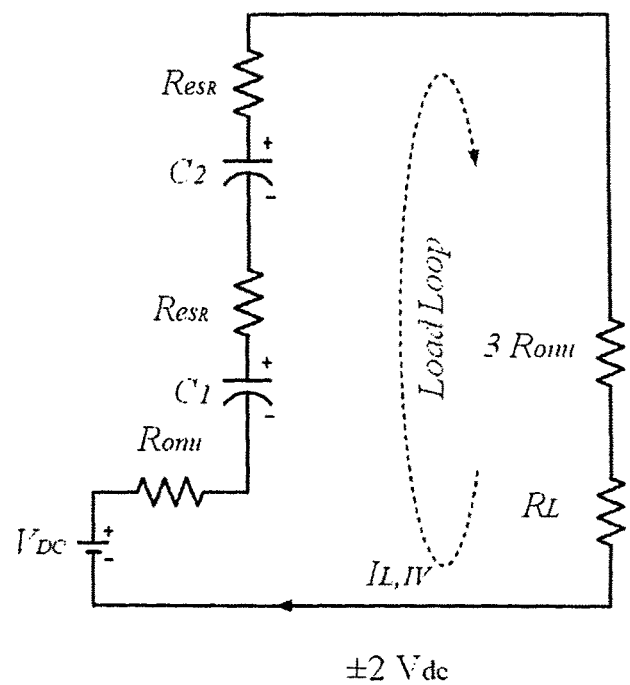
Figure 9A:
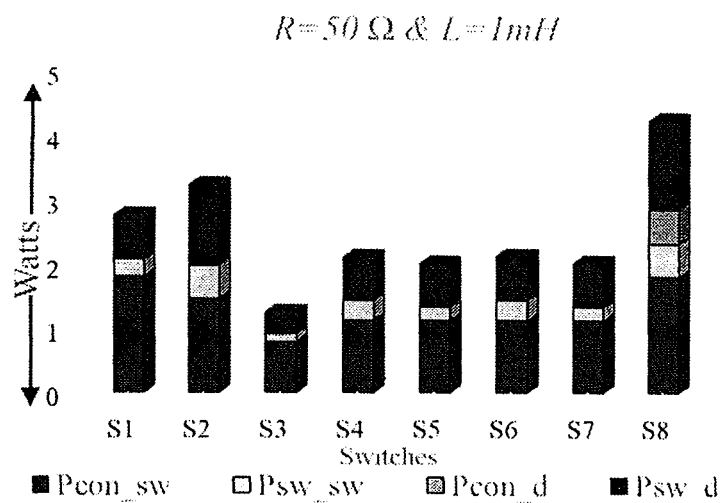
FIGS. 9A to 9D are bar graphs illustrating power loss comparison at for the 9L SCMLI at a fundamental frequency of f=50 Hz.
Figure 9B:
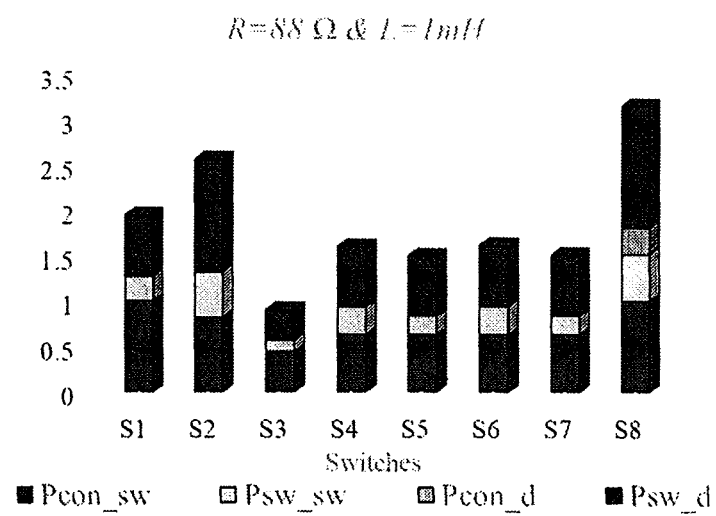
Figure 9C:
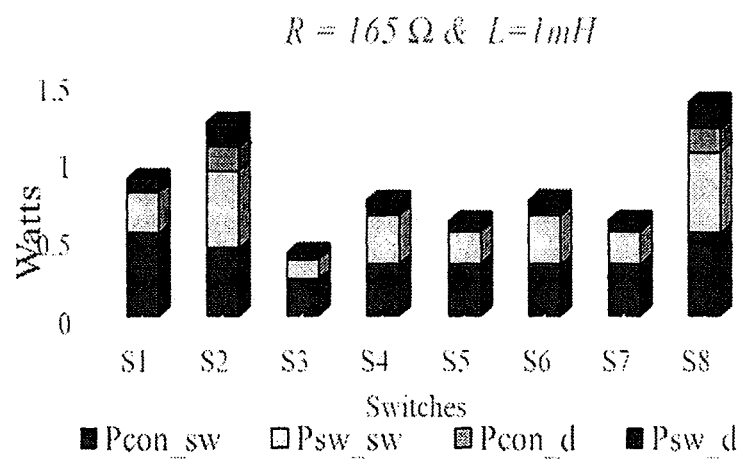
Figure 9D:
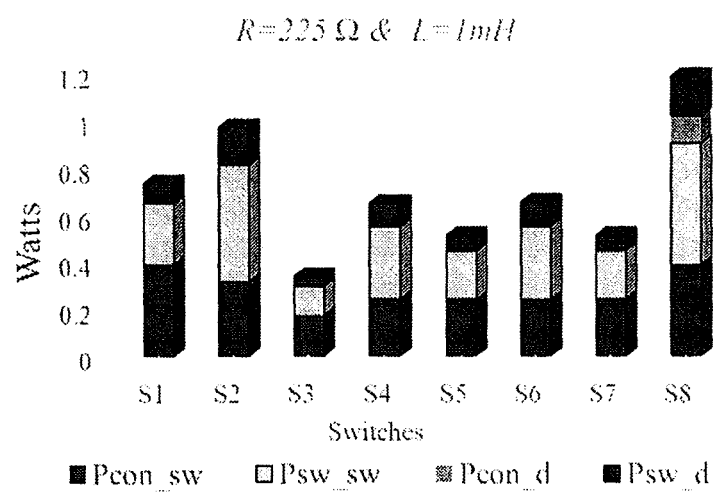
Figures 10A, 10B:
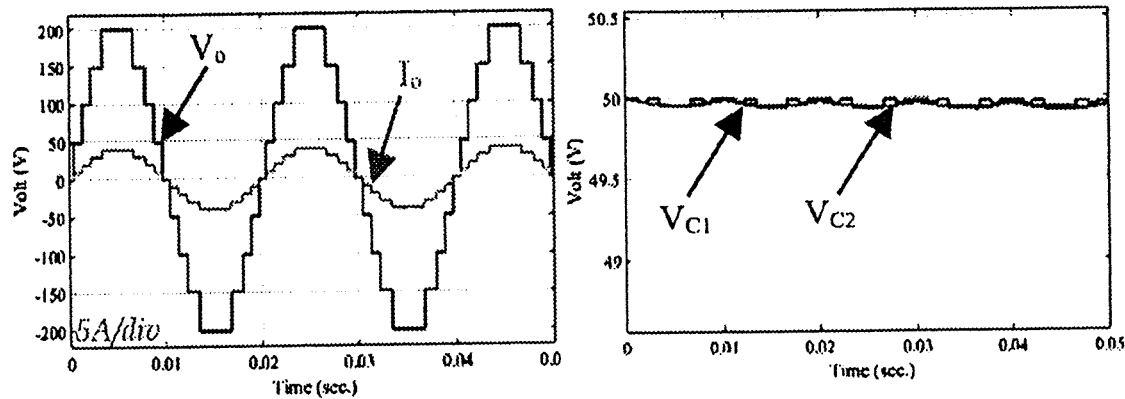
FIGS. 10A to 10D are graphs of simulation waveforms of the 9L SCMLI circuit.
Figures 10C, 10D:
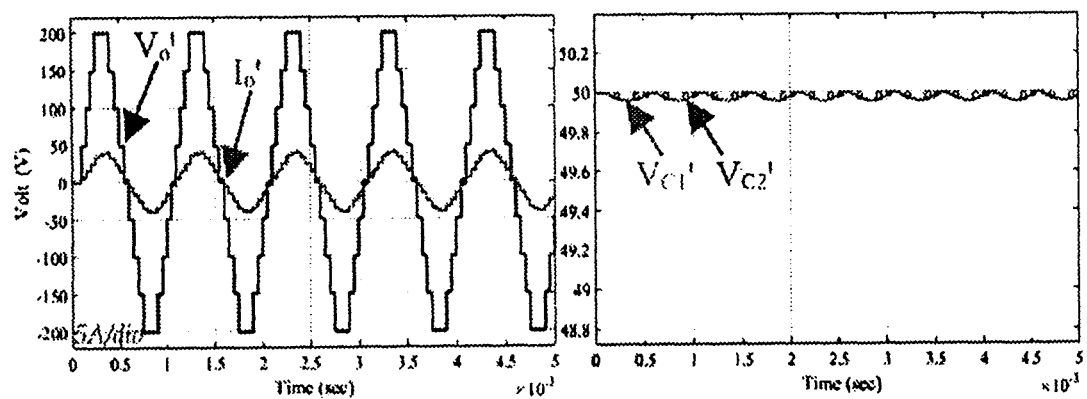

On the other hand, optimum capacitance is varied for different angles of φ at allowable voltage ripple of 5 and 10%, where k=0.05 and k=0.1, considering a constant value for $I_{max}$=5 A, $V_{dc}$, =100 V, f=50 Hz and w=100 π at fundamental frequency. It can be concluded that as q) increases the value of capacitance decreases for the SCMLI as shown in FIG. 7C.

Power loss analysis of the 9L-SCMLI includes overall loss calculation, switching losses $P_{Sw}$, conduction losses $P_{Con}$ and ripple losses $P_{Rip}$ for both capacitors at fundamental frequency as maximum loss conditions are considered during calculations.

In general, switching losses occur during ON and OFF transition state of switches. To reduce the complexity, a linear approximation between voltage and current of switches is being considered for switching period. As an outcome, following equations are considered for switching losses:

$$P_{Sw,on,i} = \int_0^{t_{on}} v(t)i(t)dt \qquad (21)$$

$$= \int_0^{t_{on}} \left[\left(\frac{V_{sw,i}}{t_{on}}t\right)\left(-\frac{I_i}{t_{on}}(t-t_{on})\right)\right]dt$$

$$= \frac{1}{6}V_{sw,i}I_i t_{on}$$

$$P_{Sw,off,i} = \int_0^{t_{off}} v(t)i(t)dt \qquad (22)$$

$$= \int_0^{t_{off}} \left[\left(\frac{V_{sw,i}}{t_{off}}t\right)\left(-\frac{I'_i}{t_{off}}(t-t_{off})\right)\right]dt$$

$$= \frac{1}{6}V_{sw,i}I'_i t_{off}$$

where $I_i$ and $I'_i$ are currents through $i^{th}$ switch, $N_{on}$ and $N_{off}$ is number of turn on and off a switch during fundamental cycle k. As a result to calculate total switching loss per one cycle can be written as follows:

$$P_{sw,i} = \frac{1}{6T}\sum_{i=1}^{7}\left(\sum_{k=1}^{N_{on}} P_{sw,on,ik} + \sum_{k=1}^{N_{off}} P_{sw,off,ik}\right) \qquad (23)$$

In order to calculate total conduction losses at steady state, a pure resistive load ($R_L$) is considered. Based on the overall circuit analysis shown in FIGS. 8A to 8D, all possible operations are considered to calculate the maximum conduction loss. FIGS. 8A to 8D represent the equivalent circuit diagram for the 9L-SCMLI inverter. Pure resistive loading condition is considered because there should not exist any auxiliary current path between load current and output voltage to facilitate the charging of capacitors. Therefore, resistive loading condition is considered as worst condition for calculation of losses in SCMLIs Hereafter, $R_{onD}$, $R_{ESR}$, $R_{onu}$ represent internal resistance of power diode, equivalent series resistance of each capacitor and internal resistance of each switch. While VRS, VC and VF showcases reverse biased voltage of power diode, stored voltage of capacitor and forward biased voltage of power diode. By applying Kirchhoffs voltage law and Kirchhoffs current law for connecting nodes, the following equations are summarised. Equation (24) represents the charging current of involved capacitors for states $\pm V_{dc}/2$ during operating mode ($I_{L,I}$). Similarly, in equation (25) for $V_{dc}$, as it also involves charging of capacitors at second operating mode ($I_{L,II}$). Equations (27) and (28) show third and fourth operating modes with respect to FIGS. 7C and 7D, respectively. Instantaneous value of conduction losses during operating modes I, II, III and IV are given in equations (28) to (31) as follows:

$$2(R_{onD}+R_{ESR})I_{charging}+(3R_{onu}+R_{onD}R_L)I_{L,I}+ \\ R_{onD}(I_{charging}+I_{L,I})=V_{dc}-V_{RS}-2(V_c+V_F) \qquad (24)$$

$$2(R_{onD}+R_{ESR})I_{charging}+(3R_{onu}+R_{onD}R_L)I_{L,II}+(I_{L,II}+ \\ I_{charging})R_{onD}=V_{dc}+V_F-2V_c-V_{RS}) \qquad (25)$$

$$(4R_{onu}+R_{onD}+R_L+R_{ESI})I_{L,III}=V_{dc}-V_F+V_c \qquad (26)$$

$$(4R_{onu}+R_L+2_{ESR})I_{L,IV}=V_{dc}+2V_c \qquad (27)$$

As an outcome, to calculate the average value during full cycle of output voltage waveform for first, second, third and fourth voltage levels, corresponding time should be taken into consideration $$P_{con,I}=2(I_{charging})^2(R_{onD}\pm R_{ESR})+(I_{L,1})^2(3R_{onu}+R_{onD})+ \\ R_{onD}(I_{L,I}+I_{charging})^2 \qquad (28)$$

$$P_{con,II}=2(R_{onD}+2R_{ESR})(I_{charging})^2+3R_{onu}(I_{L,II})^2+R_{onD} \\ (I_{L,II}+I_{charging})^2 \qquad (29)$$

$$P_{con,III}=(4R_{onu}+R_{onD}+R_{ESR})(I_{L,III})^2 \qquad (30)$$

$$P_{con,IV}=(4R_{onu}+2R_{ESR})(I_{L,IV})^2 \qquad (31)$$

From FIGS. 8A to 8D, $(t_2-t_1)$, $(t_3-t_2)$, $(t_4-t_3)$ and $(T/4-t_4)$, respectively, are given in equations (32) to (35). As a result, the total conduction losses ($P_{con,T}$) over a full cycle output voltage are shown in equation (36).

$$P_{con,I} = \frac{4}{T}(t_2-t_1)P_{con,I} \qquad (32)$$

$$P_{con,II} = \frac{4}{T}(t_3-t_2)P_{con,II} \qquad (33)$$

$$P_{con,III} = \frac{4}{T}(t_4-t_3)P_{con,III} \qquad (34)$$

$$P_{con,IV} = \frac{4}{T}\left(\frac{T}{4}-t_4\right)P_{con,IV} \qquad (35)$$

$$P_{con,T} = P_{con,I} + P_{con,II} + P_{con,III} + P_{con,IV} \qquad (36)$$

Simulation results for power losses are compared in this section under dynamic load, where, conduction and switching losses of the 9L-SCMLI inverter are calculated for each switch. FIGS. 9A to 9D demonstrate the outcomes from loss calculation as discussed above, where $P_{con\_sw}$, $P_{sw\_sw}$ represent conduction and switching losses in IGBT and $P_{con\_d}$, $P_{sw\_d}$ represent conduction and switching losses in diode.

Only switch $S_8$ experiences maximum loss as compared to other switches. While switches present in H-bridge, that is $S_4$, $S_5$, $S_6$ and $S_7$ share almost equal losses and switch $S_3$ having the least. Overall, power loss for proposed topology is quite low.

Ripple losses usually occur when capacitors are connected in parallel for charging operation due to the difference between input voltage and voltage of capacitors. Therefore, voltage ripple of capacitors is shown in the following equation:

$$\Delta V_{Ci} = \frac{1}{Ci}\int_{t'}^{t} i_{Ci}(t)dt \qquad (37)$$

where [t-t] represents time interval of discharging modes in capacitors. Total value of ripples losses for a fundamental cycle can be seen from $$P_{Rip} = \frac{1}{2T}\sum_{i=1}^{2} C_i \Delta V_{Ci}^2 \qquad (38)$$

Since $P_{Rip}$ is inversely proportional to the capacitance Ci, larger value of capacitance leads to increase in overall efficiency. Equations (39) and (40) represent total losses using which the overall efficiency of the proposed 9L-SCMLI can be deduced as below, where $P_{out}$ is output power of the SCMLI inverter.

$$P_{Loss} = P_{Rip} + P_{Con,T} + P_{sw} \qquad (39)$$

$$\eta = \frac{P_{out}}{P_{out} + P_{Loss}} \qquad (40)$$

The simulation and experimental results validate the performance of the SCMLI according to the invention. Firstly, the SCMLIs were simulated in MATLAB/SIMUINK for values $V_{in}$=100 V with each capacitor of 470 μF having $R_{ESR}$=0.1Ω under dynamic load condition for fundamental frequency (f=50 Hz) and f=400 Hz-1 kHz. In order to verify the performance of the SCMLI experimentally, a laboratory prototype was fabricated using Semikron insulated gate bipolar transistors (IGBT SKM75GB063D switches) having $R_{onu}$=14 mΩ and power diode 25 HMR 120 with $R_{onD}$=3 mΩ and each capacitor of 470 μF were used. The dSPACE 1104 is used for generating the gate pulses at fundamental frequency of 50 Hz, while SKYPER-32-PRO-R as gate driver were used during implementation of prototype.

Figure 11A:
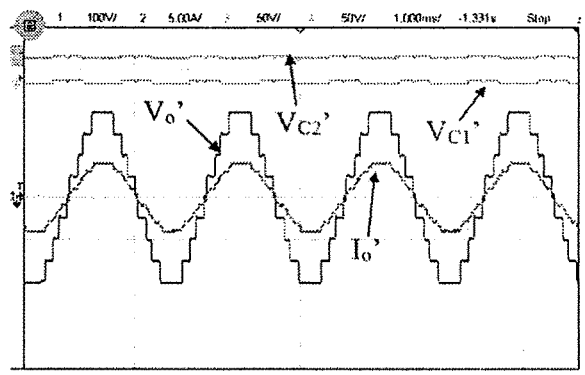
FIGS. 11A to 11C are graphs of experimental waveforms of the 9L SCMLI circuit.
Figure 11B:
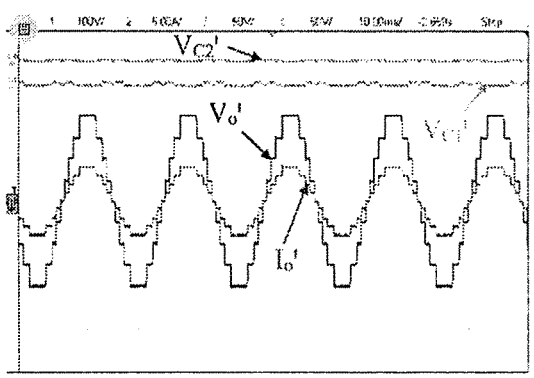
Figure 11C:
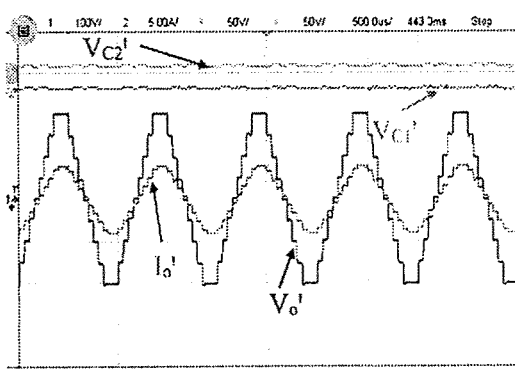
Figure 12A:
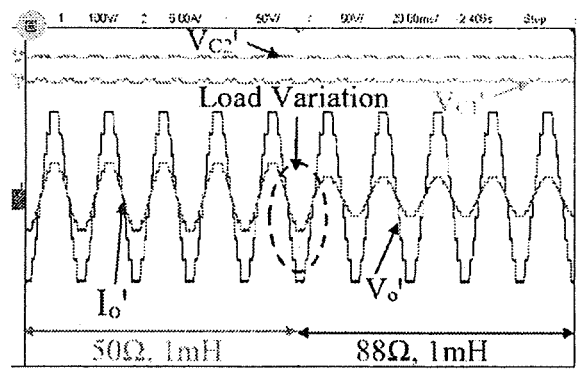
FIGS. 12A to 12C are graphs of experimental waveforms of the 9L SCMLI circuit.
Figure 12B:
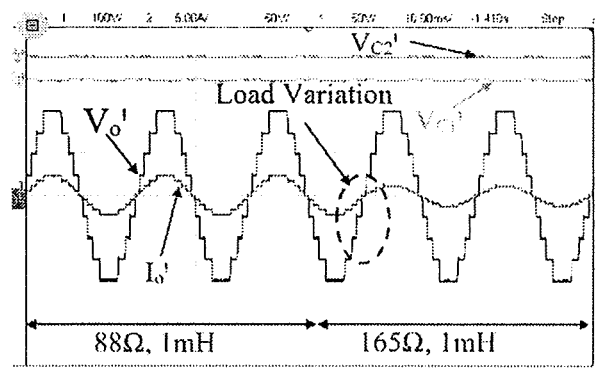
Figure 12C:
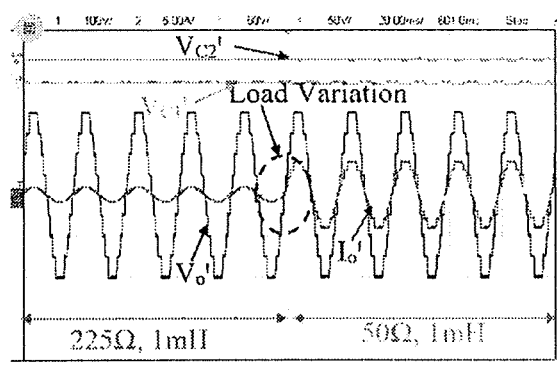
Figure 13A:
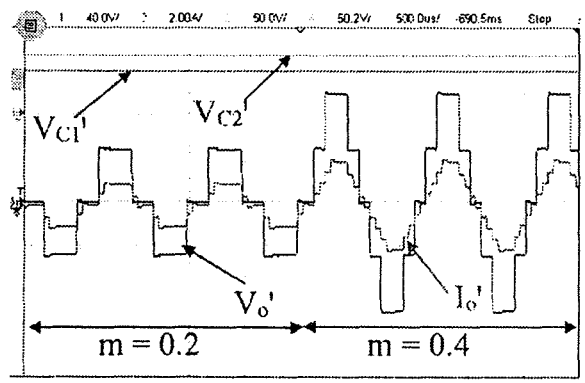
FIGS. 13A to 13C are graphs of experimental waveforms of the 9L SCMLI circcuit.
Figure 13B:
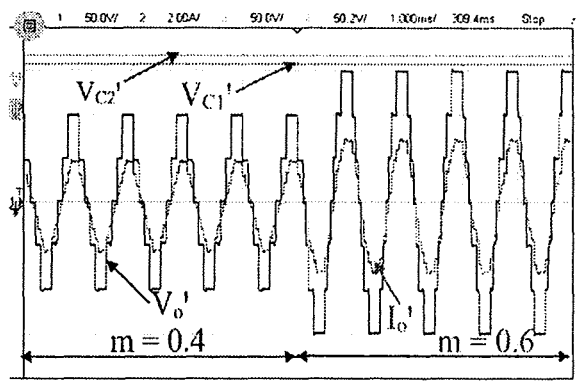
Figure 13C:
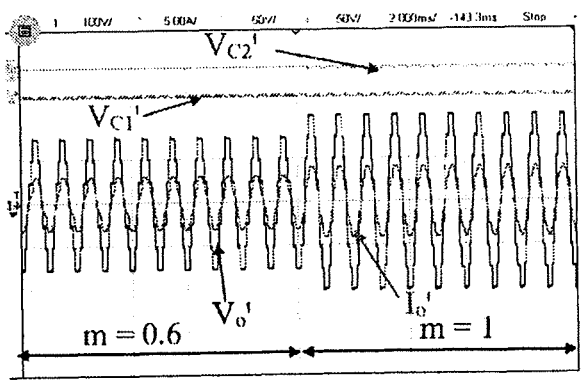
Figure 14A:
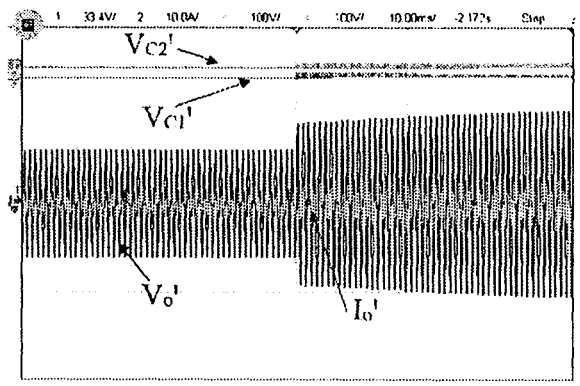
FIGS. 14A and 14B are graphs of experimental waveforms of the 9L SCMLI circuit.
Figure 14B:
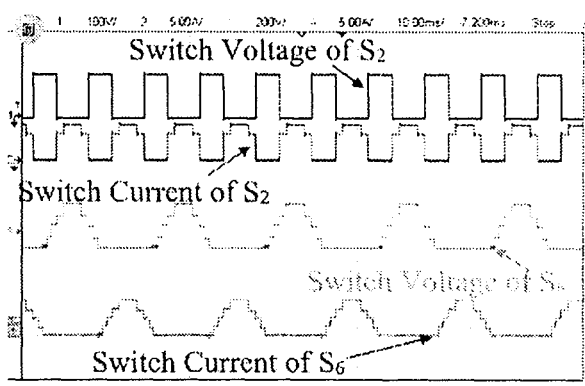
Figure 15A:
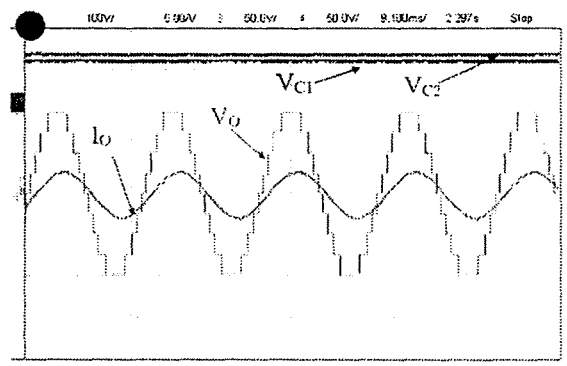
FIGS. 15A to 15C are graphs of experimental waveforms of the 9L SCMLI circuit.
Figure 15B:
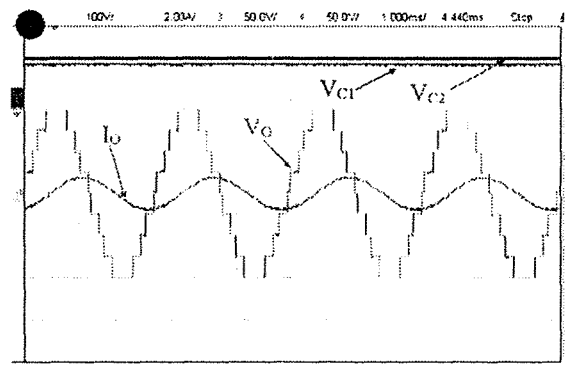
Figure 15C:
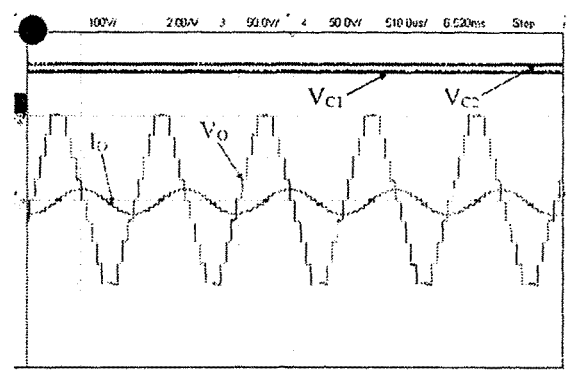

Both simulation waveforms of the 9LSCMLI at f=50 Hz and 1 kHz are shown in FIGS. 10A to 10D under R–L (R=50Ω, L=1 mH) load condition. While, experimental waveforms are shown in FIGS. 11a-c at f?=?50 Hz, 400 Hz and 1 kHz under R–L (R=50Ω, L=1 mil) load condition at different frequency having output voltage equal to 200V and output current equal to 4 A, as both capacitors voltage equal to 50V. However, waveforms shown in FIGS. 11A to 11C represent the performance of the 9L-SCMLI when opted for higher frequency at a fixed load condition. Dynamic load variation is done at f=400 Hz as shown in FIGS. 12A to 12C. Waveforms shown in FIGS. 11A to 11C highlight the feasibility of the SCMLI for load variation adaptability at higher frequency. Change in modulation index (m) is shown in FIGS. 13A to 13C. At m equal to 0.2, 0.4, 0.6 and 1 at f equal to 1 kHz. FIG. 12A represents a change in m from 0.2 to 0.4 causing change in output voltage and current waveform while the voltage across both the capacitors remains constant (capacitors are neither charged nor discharged). Similarly, as in FIG. 13B, while in FIG. 13C voltage across capacitors changes with change in in from 0.6 to 1. In conclusion, during change in m change in output voltage levels is observed as shown in FIG. 13A from 3L to 5L, FIG. 13B from 5L to 7L, FIG. 13C from 7L to 9L. Change in step input voltage from 100V to 200V is shown in FIG. 14A, generally. From low to high causing change in output voltage, current and voltage across capacitors represents the stability of the SCMLI under sudden change in input voltage at f=1 kHz. Switch voltage and current across switches $S_2$ and $S_6$ is shown in FIG. 14B at f=50 Hz under R–L (R=50Ω, L=1 mH) load condition. Feasibility of the proposed SCMLI under R–L (80Ω-100 mH) load condition is shown in FIGS. 15A and 15B.

Figure 16A:
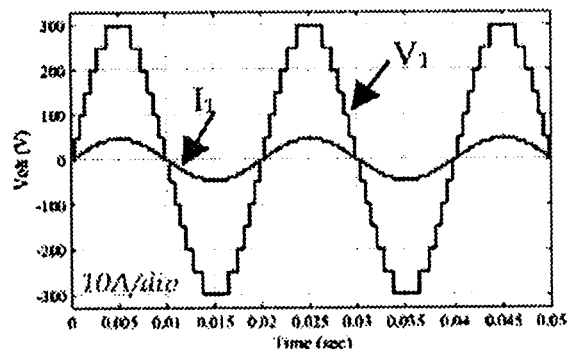
FIGS. 16A to 16D are graphs of experimental waveforms of a 13L SCMLI circuit.
Figure 16B:
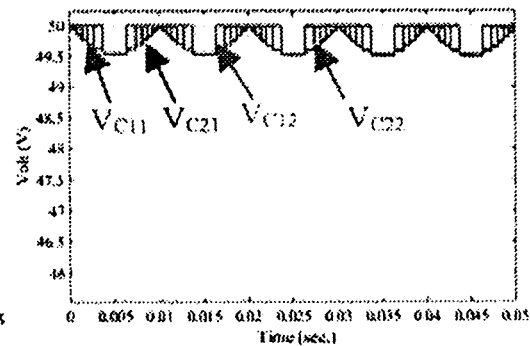
Figure 16C:
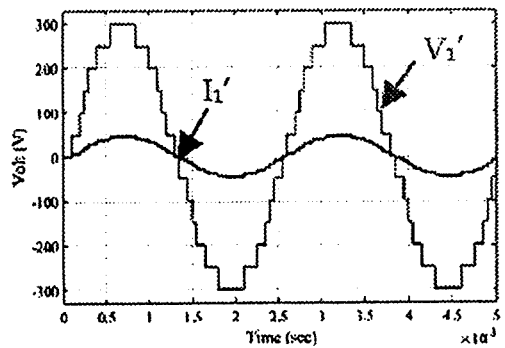
Figure 16D:
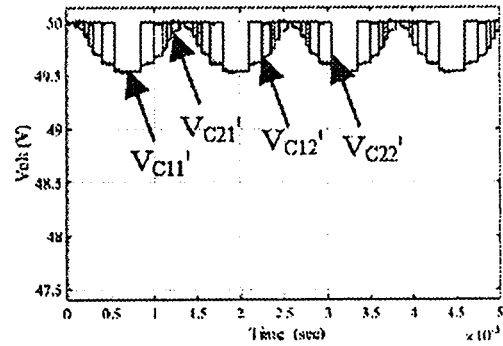
Figure 17A:
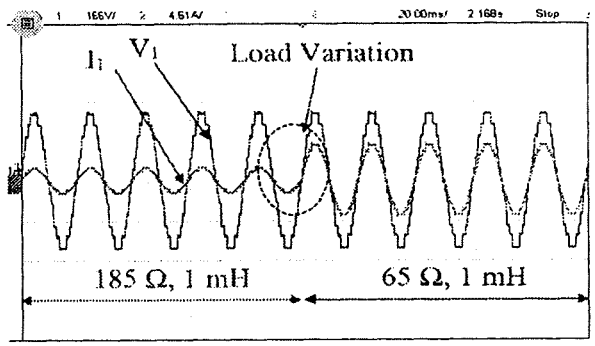
FIGS. 17A to 17C are graphs of experimental waveforms of the 13LSCMILI circuit.
Figure 17B:
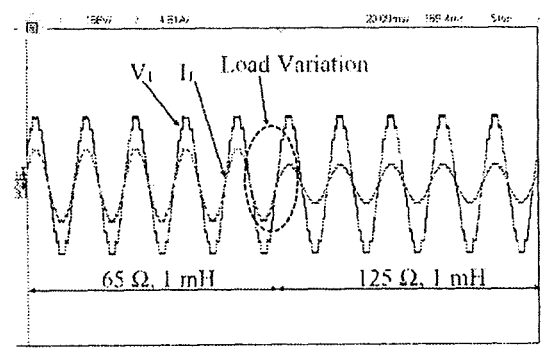
Figure 17C:
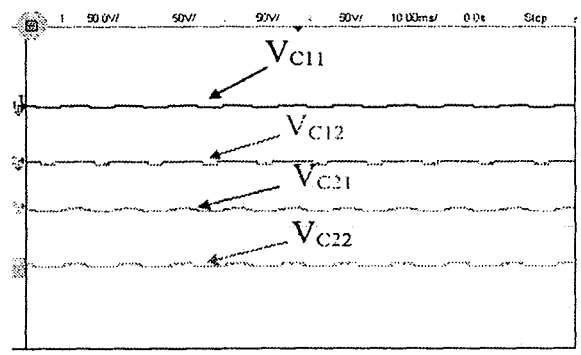

Results of a31L-SCMLI (HE) are presented. As shown in FIGS. 16A and 16B, simulation results representing output voltage, current and voltage across capacitors is shown at f=50 Hz under R–L (R=65Ω, L=1 mH) load condition. Similarly, under the same load condition at f=400 Hz simulation results are shown in FIGS. 16C and 16D. While, experimental results are shown in FIGS. 17A and 17B representing the feasibility of the SCMLI under dynamic load variation and output voltage across capacitors is shown in FIG. 17C under R–L (R=65Ω, L=1 mH) load at f=50 Hz.

Figure 18:
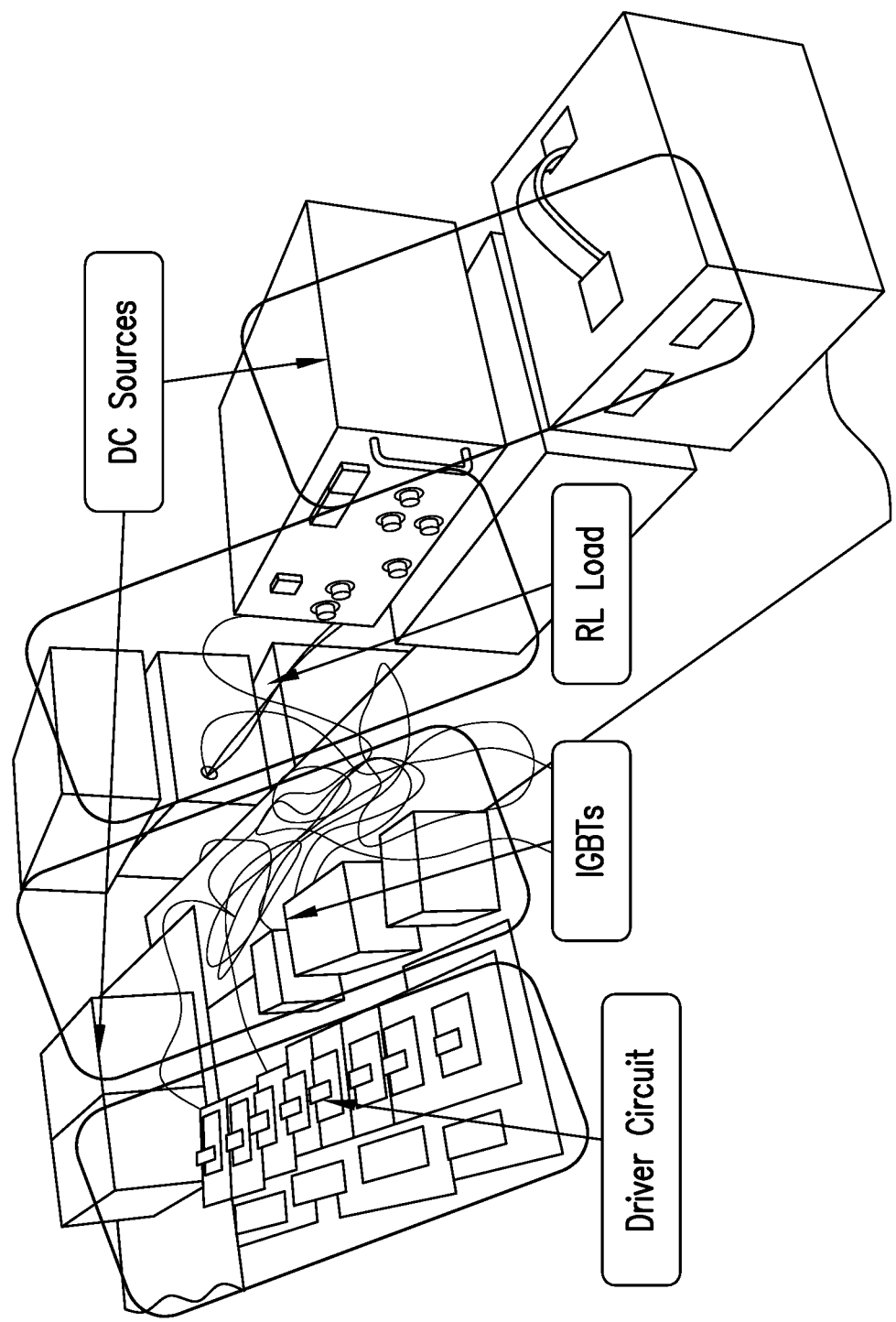
FIG. 18 is a pictorial representation of an experimental prototype model.
Figure 19:
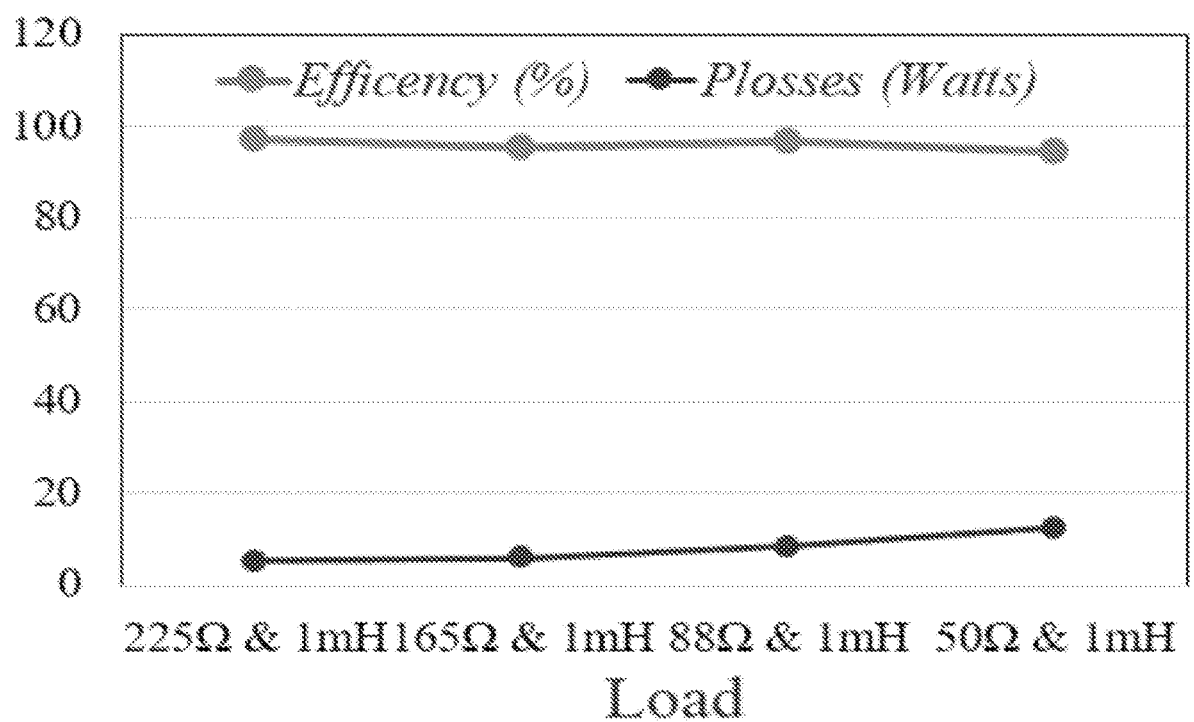
FIG. 19 is a graph illustrating efficiency analysis of the 9L SCMLI w.r.t. to load variation at f=50 Hz.

In conclusion, the above discussed waveforms represent the operability of the SCMLI under dynamic conditions. The experimental prototype used for testing is shown in FIG. 18. FIG. 19 represents the efficiency graph for the proposed 9L-SCMLI w.r.t. to load variation at f=50 Hz having efficiency up to 97.08% (R=225Ω, L=1 mH).

While the invention has been described in terms of a preferred embodiments, those skilled in the art will recognize that the invention can be practiced with modification within the spirit and scope of the appended claims.

Having thus described our invention, what we claim as new and desire to secure by Letters Patent is as follows:

1. A switched capacitor multilevel inverter (SCMLI) comprising:
   a single DC power supply providing an input voltage $V_{dc}$;
   a capacitor;
   first, second and third switches, the DC power supply and the first switch connected in a first circuit branch, the second switch and the capacitor connected in a second circuit branch parallel to the first circuit branch, and the third switch connected between a first junction of the DC power supply and the first switch and a second junction of the second switch and the capacitor to form a boosting circuit in a first bridge circuit configuration;
   fourth and fifth switches each connected to a third junction of the first switch and the capacitor of the bridge circuit, the fourth and fifth switches forming a third circuit branch;
   sixth and seventh switches each connected to a fourth junction of the DC power supply and the second switch of the bridge circuit, the sixth and seventh switches forming a fourth circuit branch parallel to the third circuit branch and the boosting circuit connected between the third and fourth junctions in a second circuit configuration; and
   a load connected between a fifth junction of the fourth and sixth switches and a sixth junction of the fifth and seventh switches, whereby
   the first to seventh switches are operated to generate a peak output voltage of magnitude twice the input voltage in five distinct voltage levels,
   wherein the SCMLI only has seven switches which are the first, second third, fourth, fifth, sixth, and seventh switches.

2. A switched capacitor multilevel inverter (SCMLI) comprising:
   a single DC power supply providing an input voltage $V_{dc}$;
   first and second capacitors connected in series;
   a first diode connected in series with the DC power supply in a first circuit branch;
   a first switch connected in series with the series connection of the first and second capacitors in a second circuit branch;
   a second switch connected between a first junction of the DC power supply and the first diode and a second junction of the first switch and the series connection of the first and second capacitors to form a first bridge circuit configuration;
   third and fourth switches connected in a third circuit branch, and fifth and sixth switches connected in a fourth circuit branch parallel to the third circuit branch;
   a load connected between a third junction of the third and fourth switches and a fourth junction of the fifth and sixth switches to form a second bridge circuit configuration;

a seventh switch connected between a fifth junction of the first diode and the second capacitor and a sixth junction of the third and fifth switches of the second bridge circuit configuration; and an eighth switch and a second diode connected in series between a seventh junction between the first and second capacitors and the sixth junction, whereby the first to eighth switches are operated to generate a peak output voltage of magnitude twice the input voltage in nine distinct voltage levels, wherein the SCMLI only has eight switches which are the first, second third, fourth, fifth, sixth, seventh, and eighth switches.

3. A switched capacitor multilevel inverter (SCMLI), comprising:
- a basic structure with a first cell comprising
  - a single DC power supply providing an input voltage $V_{dc}$;
  - first and second capacitors connected in series;
  - a first diode connected in series with the DC power supply in a first circuit branch;
  - a first switch connected in series with the series connection of the first and second capacitors in a second circuit branch;
  - a second switch connected between a first junction of the DC power supply and the first diode and a second junction of the first switch and the series connection of the first and second capacitors to form a first bridge circuit configuration;
  - third and fourth switches connected in a third circuit branch, and fifth and sixth switches connected in a fourth circuit branch parallel to the third circuit branch;
  - a load connected between a third junction of the third and fourth switches and a fourth junction of the fifth and sixth switches to form a second bridge circuit configuration;
  - a seventh switch connected between a fifth junction of the first diode and the second capacitor and a sixth junction of the third and fifth switches of the second bridge circuit configuration; and
  - an eighth switch and a second diode connected in series between a seventh junction between the first and second capacitors and the sixth junction, whereby
  - the first to eighth switches are operated to generate a peak output voltage of magnitude twice the input voltage in nine distinct voltage levels,
  - wherein the basic structure only has eight switches which are the first, second third, fourth, fifth, sixth, seventh, and eighth switches,
  - wherein the first and second capacitors, the first diode, the first and second switches, the seventh switch, and the eighth switch and second diode form the first cell; and
- one or more cells which replicate the first cell of the basic structure to generate a higher number of higher voltage levels in multiple distinct voltage levels, the number of voltage levels being a function of the number of cells.

4. The switched capacitor multilevel inverter (SCMLI) of claim 3, wherein the one or more cells are replicated horizontally.

5. The switched capacitor multilevel inverter (SCMLI) of claim 3, wherein the one or more cells are replicated vertically.

* * * * *